Dec. 10, 1935. M. A. POWERS Re. 19,785

HEARTH FOR OIL BURNING FURNACES

Original Filed Nov. 25, 1929

Inventor
Milton A. Powers

By Strauch & Hoffman
Attorneys

Reissued Dec. 10, 1935 Re. 19,785

UNITED STATES PATENT OFFICE 19,785

HEARTH FOR OIL BURNING FURNACES

Milton A. Powers, Detroit, Mich., assignor, by mesne assignments, to The Timken Silent Automatic Company, Detroit, Mich., a corporation of Michigan Original No. 1,842,049, dated January 19, 1932, Serial No. 409,730, November 25, 1929. Application for reissue January 18, 1934, Serial No. 707,223

10 Claims. (Cl. 158—4)

The invention relates to oil burning furnaces and has more particular reference to the construction of the hearth or refractory member against which the liquid fuel spray is projected. Heretofore certain hearth constructions have been used in connection with oil burners of the rotary nozzle type in which an annular groove or channel is arranged adjacent to the periphery of the hearth for the collection of a portion of the liquid fuel. This has the advantage that after the hearth is heated the liquid fuel which drains into this groove or channel will be vaporized and will be commingled with the radially propelled air current. It has been found, however, that where the air current is of considerable strength it will sweep over the depressed surface of the groove carrying away any vapor which may have been formed therein without giving it time to be ignited. This is particularly true during the starting cycle when the hearth is cold and the rate of production of vapor very low. Under these circumstances it is found that even though ignition takes place at one point in the hearth ring great difficulty is encountered in propagating the flame around the remainder of the ring. It is evident that propagation along the hearth ring is entirely dependent upon the advance of inflammable vapor. If this vapor is blown from the ring there will be little or no flame propagation and ignition failure will result. It is customary to have a vertically extending peripheral wall in rear of the groove which receives the sprayed oil and changes the direction of the commingled air and fuel vapor from the horizontal. The mixing of the air and the oil vapors and their redirection upward results in a combustible mixture which burns above the hearth ring in close proximity to the wall of the combustion chamber. Unless special provision is made the upward velocity of the vapor air mixture may exceed the rate of flame propagation downward with the consequence that the flame lifts completely away from the hearth member at times and may remain completely extinguished at various points along the ring.

It is the object of the present invention first to provide a well protected area along which the vapors may advance to insure rapid combustion around the entire periphery of the hearth ring. It is a further object to obtain a more thorough commingling of the fuel vapors and air to facilitate combustion. A third and equally important object is to provide a connected series of small areas in the combustion zone which will initiate combustion at all times in close proximity to the upper edge of the hearth ring and maintain ignition over each area continuously. With these objects in view the invention consists in the construction as hereinafter set forth.

Figure 1:
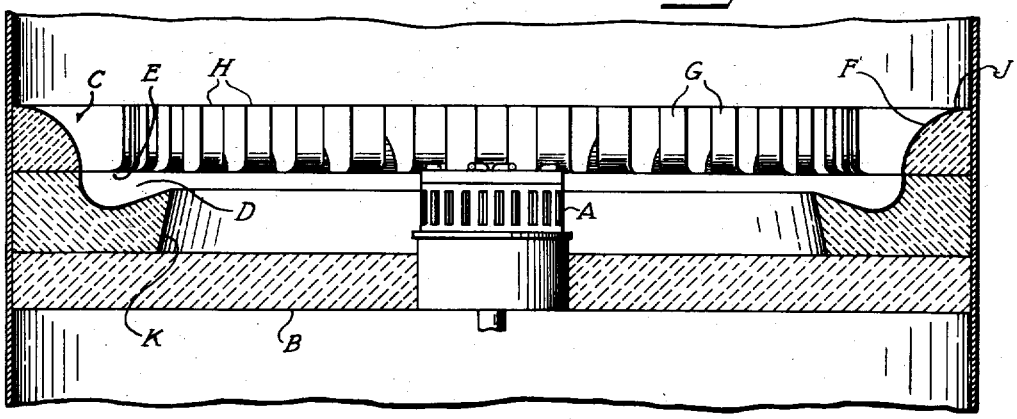
Figure 1 is a vertical central section through an oil burning furnace to which my improvements are applied.
Figure 3:
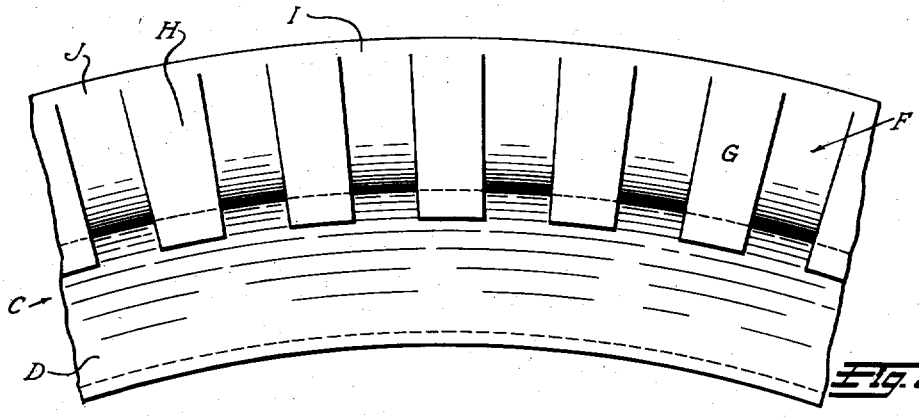
Figure 3 is a plan view.
Figure 2:
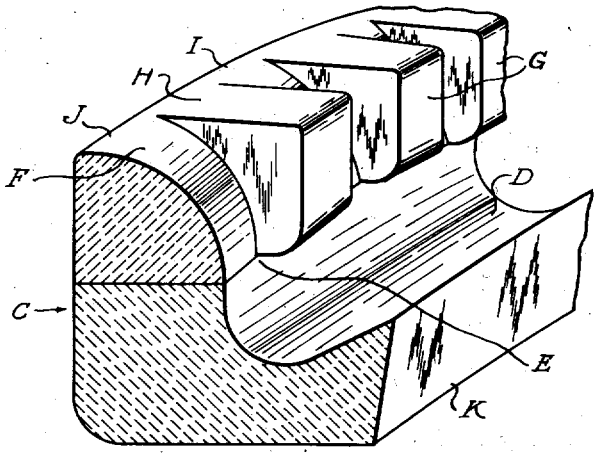
Figure 2 is an enlarged cross section through a portion of the hearth.

As illustrated, A is a rotary oil burning nozzle of any suitable construction and B is the refractory hearth surrounding this burner and extending to the walls of the furnace. Supported on the peripheral portion of this hearth B is a hearth ring C having a grooved inner ledge forming a channel or groove D and an upward and somewhat inwardly extending wall or upturned peripheral portion E terminating in an outwardly curved or flaring portion F. The front wall of the ledge forms a shoulder or wall K. The portion F has projecting approximately radially inward therefrom a series of spaced lugs G, the inner faces of which are substantially vertical and the top faces substantially horizontal. These horizontal surfaces H merge with the flaring surface F at a point I to form a continuous flat top J from this point outward.

With the construction just described the liquid fuel spray which is discharged radially from the rotary burner A is projected against the wall or upturned peripheral portion E from which it is vaporized. The portion of the spray not immediately vaporized drains downward into the channel or groove D. When a running heat balance is established there will be practically no liquid fuel drained into the channel or groove D. During the starting cycle however some will collect there but is vaporized and burned as the refractory member becomes heated. The air stream radiated from the burner toward the hearth ring advances in close proximity to the floor of the hearth itself. When it reaches the hearth ring it is deflected upward by the shoulder or wall K mixing with the vapor from the groove D. However on account of the depth of the groove D and the interference of the shoulder or wall K the tendency of the air current to sweep into the groove D is minimized. The protected area within the groove D thus serves to readily conduct vapor and consequently the flame itself from the point of ignition entirely around the ring. Intermediate the lugs G the commingled air and fuel is permitted to rise along the curved surface F but the fact that the flat surfaces H and J form a considerable portion of the area will cause the formation of return eddies which hold the flame downward nearer to the hearth top. The fact that the spaced flat surfaces H are connected by the surface J serves to readily establish and maintain burning above each of these surfaces. In addition the proximity of the flame to the hearth imparts a higher temperature to the hearth with the result that the liquid fuel is more perfectly vaporized.

The construction above described can be manufactured as readily as hearth constructions which have heretofore been used and greatly increases the ease of starting and general reliability and efficiency of the burner.

What I claim as my invention is:

1. The combination with a rotary oil burner nozzle provided with means for radially discharging liquid fuel and air, of a refractory hearth surrounding said burner provided with an upturned ledge for deflecting the air stream upward, a continuous deep groove in the lee of the ledge and a serrated rear wall against which the oil spray impinges, the projections between serrations serving to hold the flame in proximity to said groove.

2. The combination with a rotary oil burner provided with means for radially discharging liquid fuel and air, of a hearth surrounding said burner provided with upturned peripheral portions and a depressed annular groove or channel adjacent to this portion for receiving liquid fuel and a series of spaced lugs projecting inward from said up-turned portion adapted to obstruct the flow to improve mixing of the air and vapors and to prevent sweeping of the vapor from said channel and to hold the flame in proximity to said groove.

3. The combination with a rotary oil burner provided with means for radially discharging liquid fuel and air, of a hearth surrounding said burner provided with an upturned peripheral portion and a depressed groove or channel adjacent thereto for receiving liquid fuel and a series of spaced lugs projecting inward from said up-turned portion, said lugs having substantially flat tops and the wall intermediate said lugs being flared outward for the purpose described.

4. The combination with a rotary oil burner provided with means for radially discharging liquid fuel and air, of a hearth surrounding said burner, a ring supported on a peripheral portion of said hearth and having an inwardly extending grooved ledge merging into an upwardly and inwardly extending portion terminating in an outwardly flaring portion, a series of spaced lugs projecting inward from the latter portion and having substantially vertical inner faces and substantially horizontal top faces for the purposes described.

5. A combination with a rotary oil burner provided with means for radially discharging liquid fuel and air, of a hearth surrounding said burner, a refractory ring supported upon the peripheral portion of said hearth and comprising an inwardly extending grooved ledge merging into upwardly projecting spaced lugs above the latter portion provided with substantially vertical inner faces and substantially horizontal top faces, and outwardly flaring grooves between said lugs merging into the flat upper surfaces thereof and forming a continuous flat ring beyond the point of merging.

6. The combination with a rotary oil burner provided with means for radially discharging liquid fuel and air, of a hearth surrounding said burner provided with an up-turned peripheral portion and a depressed groove or channel adjacent thereto for receiving liquid fuel, and a series of spaced lugs on said upturned portion, said lugs having substantially flat tops and the wall intermediate said lugs being flared outward for the purpose described.

7. The combination with a rotary oil burner provided with means for radially discharging liquid fuel and air, of a hearth surrounding said burner provided with an upturned peripheral portion and a depressed groove or channel adjacent thereto for receiving liquid fuel, and a series of spaced lugs projecting inward from said upturned portion, said lugs forming an obstruction to a portion of the current directed upward by said upturned peripheral portion and thereby retaining the flame in proximity to said groove.

8. An oil burning furnace having a rotary radially discharging liquid fuel and air nozzle, a hearth ring surrounding said nozzle comprising walls disposed to interrupt respectively the flow of air and fuel from said nozzle, said walls being spaced and arranged at different levels with the wall interrupting the flow of air nearest said nozzle, said hearth ring having a groove between said walls of a depth sufficient to provide an annular area protected from the sweep of air whereby travel of the flame around the hearth can take place without interruption due to the operation of said nozzle, and means to hold the flame in proximity to said groove.

9. The combination with a rotary oil burner nozzle provided with means for radially discharging liquid fuel and air, of a hearth ring surrounding said burner nozzle provided with an upturned wall at its periphery and a ledge extending inwardly from said wall, and a multiplicity of laterally spaced portions projecting inwardly from and formed as a part of said wall but arranged in spaced relation to said ledge and overhanging the latter to hold the flame in proximity thereto.

10. The combination with a rotary oil burner nozzle provided with means for radially discharging liquid fuel and air, of a hearth ring surrounding said burner and provided with an upturned portion at its periphery in the path of the fuel, said hearth ring having a depressed annular groove below and in front of said upturned portion for receiving a portion of the liquid fuel, and laterally spaced lugs projecting from said portion and overhanging said groove to hold the flame in proximity thereto.

MILTON A. POWERS.